United States Patent
Razavi

(10) Patent No.: US 7,449,527 B2
(45) Date of Patent: Nov. 11, 2008

(54) POLYOLEFIN PRODUCTION

(75) Inventor: Abbas Razavi, Mons (BE)

(73) Assignee: Total Petrochemicals Research Feluy, Feluy (BE)

( * ) Notice: Subject to any disclaimer, the term of this patent is extended or adjusted under 35 U.S.C. 154(b) by 344 days.

(21) Appl. No.: 10/529,247

(22) PCT Filed: Sep. 24, 2003

(86) PCT No.: PCT/EP03/10711

§ 371 (c)(1),
(2), (4) Date: Aug. 12, 2005

(87) PCT Pub. No.: WO2004/029106

PCT Pub. Date: Apr. 8, 2004

(65) Prior Publication Data

US 2006/0094836 A1    May 4, 2006

(30) Foreign Application Priority Data

Sep. 27, 2002   (EP) ................... 02079062

(51) Int. Cl.
*C08F 4/6392*   (2006.01)
*C08F 4/6592*   (2006.01)

(52) U.S. Cl. ............. 526/113; 526/114; 526/118; 526/119; 526/126; 526/127; 526/160; 526/170; 525/53; 525/191; 525/240

(58) Field of Classification Search .............. 526/113, 526/114, 118, 119, 126, 127, 160, 170; 525/53, 525/191, 240

See application file for complete search history.

(56) References Cited

U.S. PATENT DOCUMENTS

| | | | |
|---|---|---|---|
| 5,700,886 A * | 12/1997 | Winter et al. | ............... 526/119 |
| 5,714,427 A | 2/1998 | Winter et al. | |
| 5,719,241 A | 2/1998 | Razavi et al. | |
| 6,143,683 A | 11/2000 | Shamshoum et al. | |
| 6,207,606 B1 | 3/2001 | Lue et al. | |
| 6,346,575 B1 | 2/2002 | Debras et al. | |
| 6,515,086 B1 * | 2/2003 | Razavi | ............... 526/160 |

FOREIGN PATENT DOCUMENTS

| | | | |
|---|---|---|---|
| EP | 0 427 696 A2 | | 5/1991 |
| EP | 1 405 866 A1 | | 4/2004 |
| WO | WO 02/090398 A2 | | 11/2002 |
| WO | WO 2004/029106 | * | 4/2004 |

OTHER PUBLICATIONS

Liu, J., Rytter, E., "Bimodal Polyethylenes Obtained with a Dual-Site Metallocene Catalyst System. Effect of Trimethylaluminum Addition," Macromolecular Rapid Communications, 2001, vol. 22, pp. 952-956.

* cited by examiner

*Primary Examiner*—Roberto Rábago
(74) *Attorney, Agent, or Firm*—Diane L. Kilpatrick-Lee

(57) ABSTRACT

Provided is a process for producing a polyolefin having a multimodal molecular weight distribution, which process comprises: (a) polymerizing a first olefin monomer in the presence of an isomerizable metallocene catalyst, to form a first multi-modal polyolefin component; and (b) polymerizing a second olefin monomer in the presence of a second metallocene catalyst to form a second polyolefin component; wherein the molecular weight distribution of the first polyolefin component overlaps with the molecular weight distribution of the second polyolefin component.

24 Claims, 2 Drawing Sheets

| Mn | 9664 | Mz | 2436538 | D | 33.6 | A | 4620 |
| Mw | 324565 | Mp | 14614 | D' | 7.5 | | |

| Mn | 9654 | Mz | 2436538 | D | 33.6 | A | 4620 |
| Mw | 324565 | Mp | 14614 | D' | 7.5 | | |

POLYOLEFIN PRODUCTION

The present invention concerns processes for producing polyolefins having a controlled multimodal molecular weight distribution. The invention also relates to polyolefins produced using the process of the invention.

In many applications in which polyolefins are employed, it is desirable that the polyolefin used has good mechanical properties. It is known that, in general, high molecular weight polyolefins have good mechanical properties. Additionally, since the polyolefin must usually undergo some form of processing (such as moulding processes and extrusion processes and the like) to form the final product, it is also desirable that the polyolefin used has good processing properties. However, unlike the mechanical properties of the polyolefin, its processing properties tend to improve as its molecular weight decreases.

Thus, a problem exists to provide a polyolefin which simultaneously exhibits favourable mechanical properties and favourable processing properties. Attempts have been made in the past to solve this problem, by producing polyolefins having both a high molecular weight component (HMW) and a low molecular weight component (LMW). Such polyolefins have either a broad molecular weight distribution (MWD), or a multimodal molecular weight distribution.

There are several methods for the production of multimodal or broad molecular weight distribution polyolefins. The individual polyolefins can be melt blended, or can be formed in separate reactors in series. Use of a dual site catalyst for the production of a bimodal polyolefin resin in a single reactor is also known.

Chromium catalysts for use in polyolefin production tend to broaden the molecular weight distribution and can in some cases produce bimodal molecular weight distribution, but usually the low molecular part of these resins contains a substantial amount of the co-monomer. Whilst a broadened molecular weight distribution provides acceptable processing properties, a bimodal molecular weight distribution can provide excellent properties.

Ziegler-Natta catalysts are known to be capable of producing bimodal polyethylene using two reactors in series. Typically, in a first reactor, a low molecular weight homopolymer is formed by reaction between hydrogen and ethylene in the presence of the Ziegler-Natta catalyst. It is essential that excess hydrogen be used in this process and, as a result, it is necessary to remove all the hydrogen from the first reactor before the products are passed to the second reactor. In the second reactor, a copolymer of ethylene and hexene is made so as to produce a high molecular weight polyethylene.

Metallocene catalysts are also known in the production of polyolefins. For example, EP-A-0619325 describes a process for preparing polyolefins having a bimodal molecular weight distribution. In this process, a catalyst system which includes two metallocenes is employed. The metallocenes used are, for example, a bis(cyclopentadienyl) zirconium dichloride and an ethylene-bis(indenyl) zirconium dichloride. By using the two different metallocene catalysts in the same reactor, a molecular weight distribution is obtained, which is at least bimodal.

A problem with known bimodal polyolefins is that if the individual polyolefin components are too different in molecular weight and density, they may not be as miscible with each other as desired and harsh extrusion conditions or repeated extrusions are necessary which might lead to partial degradation of the final product and/or additional cost. Thus the optimum mechanical and processing properties are not achieved in the final polyolefin product. Thus, many applications still require improved polyolefins and there is still a need to control the molecular weight distribution of the polyolefin products more closely, so that the miscibility of the polyolefin components can be improved, and in turn the mechanical and processing properties of the polyolefins can be further improved.

It is therefore an object of the present invention to solve the problems associated with the known catalysts, processes and polymers. Accordingly, the present invention provides a process for producing a polyolefin having a multimodal molecular weight distribution, which process comprises:

(a) polymerising a first olefin monomer in the presence of an isomerisable metallocene catalyst, to form a first multimodal polyolefin component; and (b) polymerising a second olefin monomer in the presence of a second metallocene catalyst to form a second polyolefin component;

wherein the molecular weight distribution of the first polyolefin component overlaps with the molecular weight distribution of the second polyolefin component.

Figure 1A:
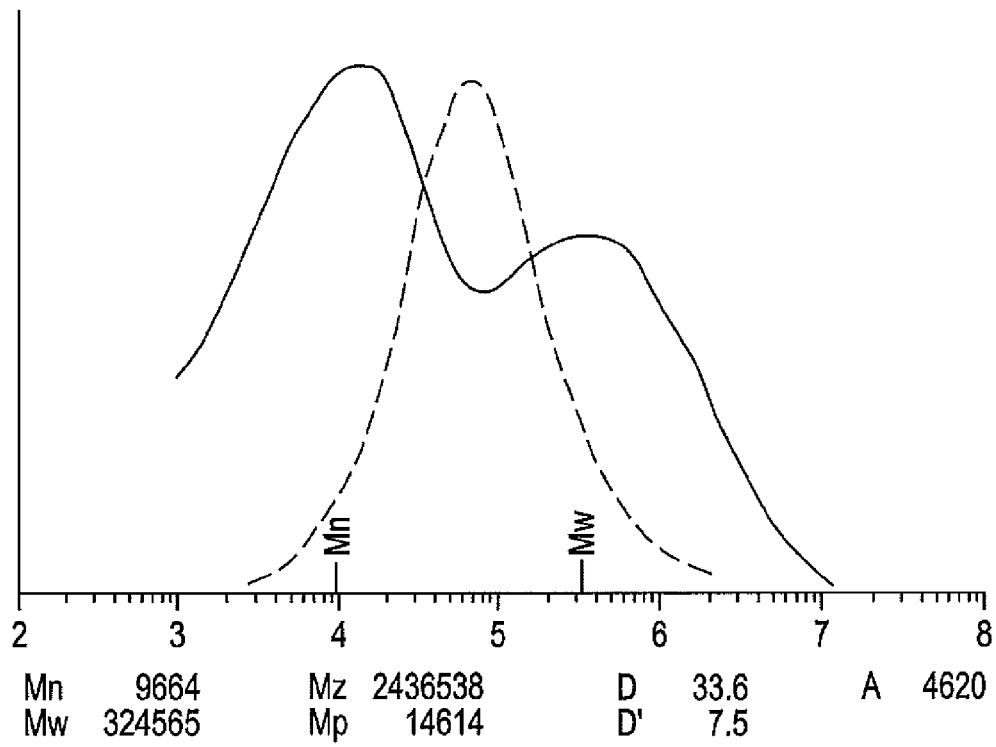
FIG. 1A demonstrates the molecular weight of a combination of a catalyst system producing a polyethylene having a narrow molecular weight distribution with a catalyst system producing a polyethylene with a bimodal molecular weight distribution.

The isomerisable catalyst is a catalyst which is able to form two or more different isomers, each of which contributes differently to the MWD of the resulting polymer. It is this different contribution which leads to the multimodal nature of the first polyolefin component. Preferred catalysts of this type are bisindenyl metallocene catalysts.

In the context of the present invention, a multimodal molecular weight distribution means a molecular weight distribution which occurs due to the polyolefin product comprising a mixture of polyolefins having different molecular weight distributions. Thus, in the present invention, a polyolefin may be multimodal even if it has only a single peak in its molecular weight distribution, as well as when it has more than one peak in its molecular weight distribution.

In the context of the present invention, the molecular weight distribution of one component overlaps with the molecular weight distribution of a second component if a proportion of the polymer molecules in one component has the same molecular weight as a proportion of polymer molecules in the second component.

An advantage of the present method is that a polyolefin having a controlled molecular weight distribution can be formed. By tailoring the catalyst components and reaction conditions to select individual polyolefin components having a desired MWD, a final product having a more predictable and controlled MWD can be produced. In particular, the formation of the second polymer component having an MWD overlapping with that of the first component facilitates the mixing of the components and allows a final product to be produced which has improved mechanical properties and improved processing properties.

The present invention will now be discussed in more detail. In a particularly preferred embodiment of the present process, the polymerising steps (a) and (b) take place in a single reaction zone, under polymerising conditions in which the catalysts producing the polymer components are simultaneously active. In this embodiment it is preferred that the metallocene catalysts producing the polymer components are part of a multi-component catalyst system, such as a two-site (dual component) catalyst system. A multi-site catalyst system is a system in which a plurality of catalysts are present on individual grains of catalyst support.

In an alternative embodiment, the polymerising steps (a) and (b) may take place in two or more reaction zones in series, the polymerising conditions in each reaction zone being selected such that one or more of the catalyst components is inactive in each reaction zone. Thus, taking as an example a two-site catalyst, in this embodiment one catalyst component may be active in a first reaction zone and a second may be active in a second reaction zone.

Preferably, the first polyolefin component comprises a bimodal polyolefin. It is also preferred that the second polyolefin component comprises a monomodal polyolefin. However, the modality of the second component is not limited provided that it's MWD overlaps with that of the first component.

The breadth of the MWD can be determined in accordance with any method generally used in the art. Preferably the breadth is determined according to the polydispersion index PDI), usually denoted by a D value. The PDI is defined as $M_w/M_n$, or the weight average molecular weight divided by the number average molecular weight. In the case of the bimodal component it is preferable that the polydispersion index, D, is from 5-9, more preferably D=5-7. In the case of the second component D is preferably less than 3 and more preferably D=2-3.

Figure 1B:
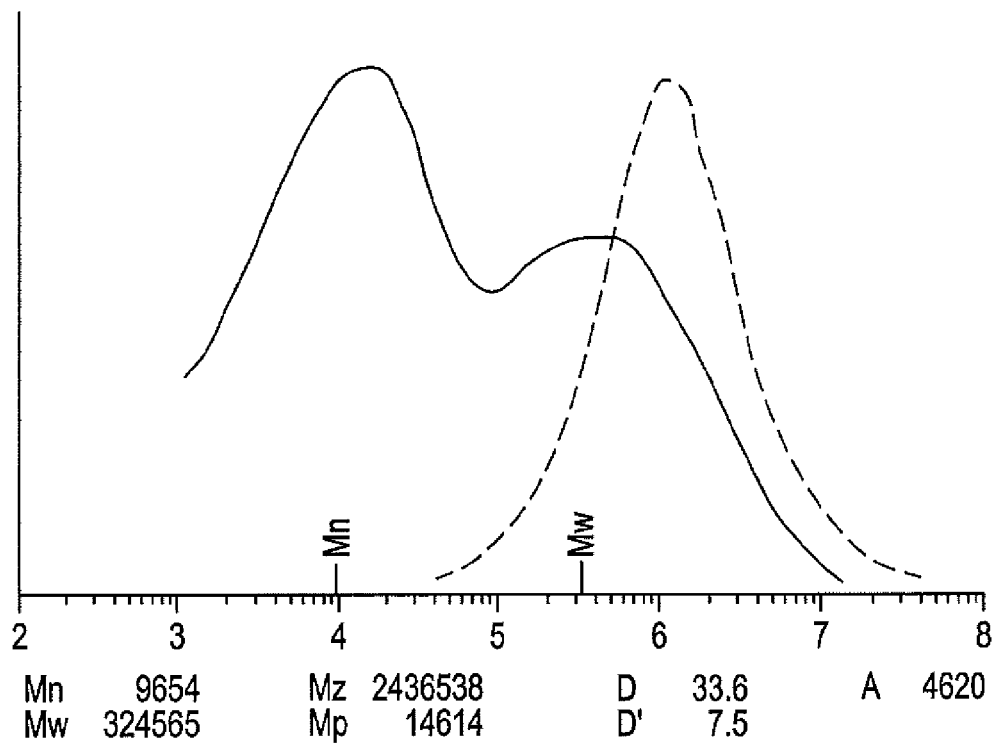
FIG. 1B demonstrates the molecular weight of another combination of a catalyst system producing a polyethylene having a narrow molecular weight distribution with a catalyst system producing a polyethylene with a bimodal molecular weight distribution.
Figure 1C:
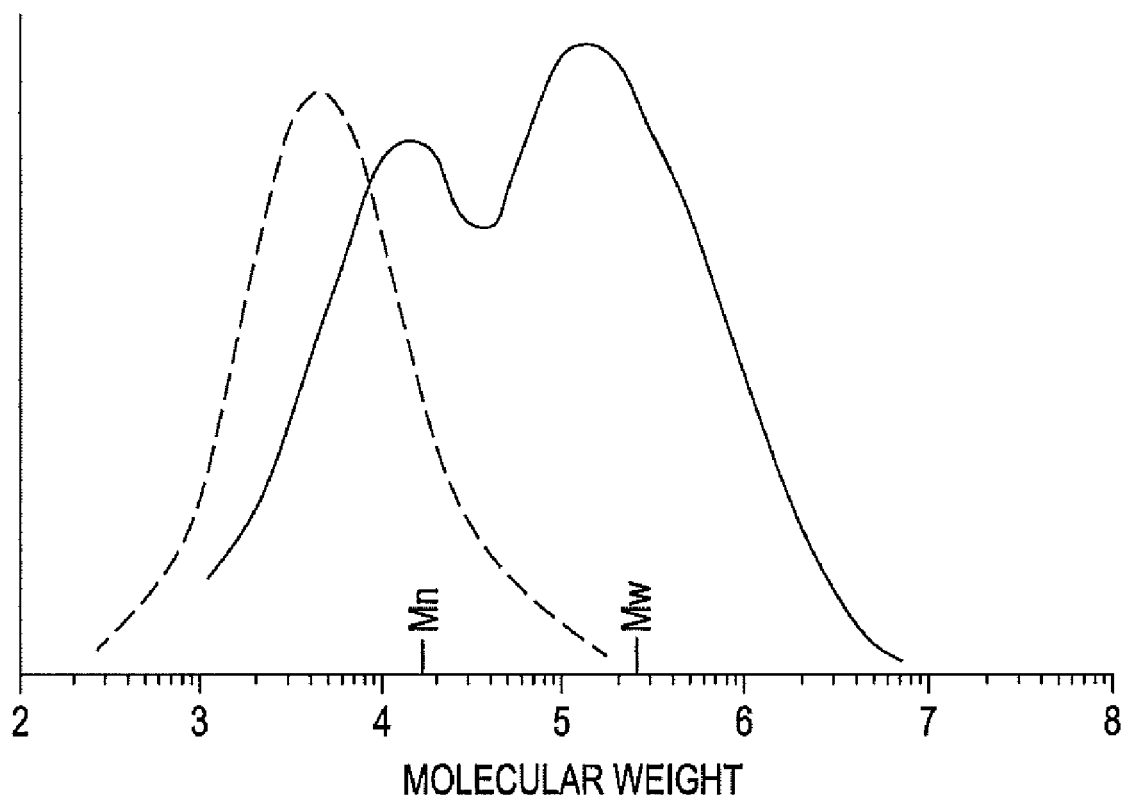
FIG. 1C demonstrates the molecular weight of yet another combination of a catalyst system producing a polyethylene having a narrow molecular weight distribution with a catalyst system producing a polyethylene with a bimodal molecular weight distribution.

The molecular weight and proportion of the second polyolefin component is controlled so that it emphasises either the lower molecular weight fraction of the final polymer, or the higher molecular weight fraction of the final polymer, depending upon the properties that are desired in the final polymer as exemplified in FIG. 1 that represents three combinations of a catalyst system producing a polyethylene having a narrow molecular weight distribution with a catalyst system producing a polyethylene with a bimodal molecular weight distribution. As can be seen from that Figure, the resulting molecular weight distribution can be tailored to produce polymers with the desired properties. Thus, the proportions of each component are not especially limited, provided that the desired improved mechanical properties and processing properties are achieved. Preferably the final polymer comprises from 35-49 wt. % of the polyolefin fraction of higher molecular weight and from 51-65 wt. % of a polyolefin fraction of lower molecular weight. More preferably, the final polymer comprises at least 55 wt. % of the fraction of lower molecular weight, most preferably at least 56 wt. %. The fraction of lower (or higher) molecular weight may be either the first or the second polyolefin component, depending on the respective MWDs of each component.

The resin according to the present invention preferably comprises not more than 45% by weight of the first polyethylene fraction of high molecular weight, most preferably at most 44 weight %.

Typically, the isomerisable metallocene catalyst comprises a bisindenyl metallocene catalyst. In a preferred embodiment, bisindenyl metallocene catalyst has the following formula:

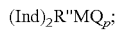

wherein each Ind is the same or different and is a substituted or unsubstituted indenyl group or a substituted or unsubstituted tetrahydroindenyl group, R" is a structural bridge imparting stereorigidity to the component; M is a metal atom from group IVB, VB or VIB of the periodic table; p is the valence of M minus 2; and each Q is a hydrocarbon having from 1-20 carbon atoms or is a halogen.

The ligand, Ind, used in catalysts discussed above is an indenyl-type ligand, in which, in the context of the present invention, the substituent positions are numbered from 1-7 according to the system set out in the structure below (although an indenyl compound is shown, the numbering is the same as in the indenyl or tetrahydroindenyl ligand):

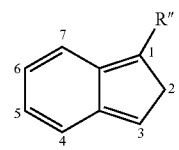

To distinguish substitution in the first ligand from the second, the second is numbered according to the same system, but from 1'-7', in accordance with convention. In this type of catalyst, the position of the bridge is not particularly limited, and is preferably a 1,1'-bridge, a 2,2'-bridge or a 1,2'-bridge, a 1,1'-bridge being most preferred.

The substitution pan em of the indenyl groups is not especially limited, provided that the catalyst is isomerisable. Thus, one or both of the indenyl groups may be substituted or unsubstituted. Symmetrical substitution patterns are preferred (i.e. both Ind groups are substituted in the same positions with the same substituents). The indenyl groups of the catalyst are preferably substituted at the 2, 2', 4 and/or 4' positions.

The substituents are not particularly limited and may comprise any organic group and/or one or more atoms from any of groups IIIA, IVA, VA, VIA or VIIA of the Periodic Table, such as a B, Si, N, P, O, or S atom or a halogen atom (e.g. F, Cl, Br or I).

When the substituent comprises an organic group, the organic group preferably comprises a hydrocarbon group. The hydrocarbon group may comprise a straight chain, a branched chain or a cyclic group. Independently, the hydrocarbon group may comprise an aliphatic or an aromatic group. Also independently, the hydrocarbon group may comprise a saturated or unsaturated group.

When the hydrocarbon comprises an unsaturated group, it may comprise one or more alkene functionalities and/or one or more alkyne functionalities. When the hydrocarbon comprises a straight or branched chain group, it may comprise one or more primary, secondary and/or tertiary alkyl groups. When the hydrocarbon comprises a cyclic group it may comprise an aromatic ring, an aliphatic ring, a heterocyclic group, and/or fused ring derivatives of these groups. The cyclic group may thus comprise a benzene, naphthalene, anthracene, indene, fluorene, pyridine, quinoline, thiophene, benzothiophene, furan, benzofuran, pyrrole, indole, imidazole, thiazole, and/or an oxazole group, as well as regioisomers of the above groups.

The number of carbon atoms in the hydrocarbon group is not especially limited, but preferably the hydrocarbon group comprises from 1-40 C atoms. The hydrocarbon group may thus be a lower hydrocarbon (1-6 C atoms) or a higher hydrocarbon (7 C atoms or more, e.g. 7-40 C atoms). The number of atoms in the ring of the cyclic group is not especially limited, but preferably the ring of the cyclic group comprises from 3-10 atoms, such as 3, 4, 5, 6 or 7 atoms.

The groups comprising heteroatoms described above, as well as any of the other groups defined above, may comprise one or more heteroatoms from any of groups IIIA, IVA, VA, VIA or VIIA of the Periodic Table, such as a B, Si, N, P, O, or S atom or a halogen atom (e.g. F, Cl, Br or I). Thus the substituent may comprise one or more of any of the common functional groups in organic chemistry, such as hydroxy groups, carboxylic acid groups, ester groups, ether groups, aldehyde groups, ketone groups, amine groups, amide groups, imine groups, thiol groups, thioether groups, sulphate groups, sulphonic acid groups, and phosphate groups etc. The substituent may also comprise derivatives of these groups, such as carboxylic acid anhydrydes and carboxylic acid halides.

In addition, any substituent may comprise a combination of two or more of the substituents and/or functional groups defined above.

Preferably the indenyl groups of the catalyst are substituted by a bulky group. In these embodiments, the bulky group is typically selected from a methyl group, an isopropyl group, a tertiary butyl group, a trimethylsilyl group, and a phenyl group. It is particularly preferred that the bulky group is in the 4-position.

In the more preferred embodiments of the invention, the 2-position and 4-position are independently substituted with a methyl, isopropyl, phenyl, ethyl or trifluoromethyl group. The other positions on the indenyl groups are preferably substituted with hydrogen, but may be substituted with one of the preferred substituents for the 2 and 4-positions, if desired. The most preferred system comprises a methyl group at the 2-position and a phenyl group at the 4-position, with hydrogen groups at the remaining positions.

When there is a phenyl group attached to the indenyl group, it may form a bicyclic system by being attached to two adjacent positions on the indenyl system, to form a benzindenyl system. It is particularly preferred that the phenyl group is attached to the 4 and 5-positions in such instances.

Preferably, the bridging group R" is an alkylidene group or a silyl group. The alkylidene group is preferably a $C_1$-$C_4$ alkylidene group. It is particularly preferred that the bridging group comprises a substituted or unsubstituted ethylidene group.

The catalyst for forming the second component is not especially limited provided that it is a metallocene and produces a component whose MWD is overlapping with that of the first component. Typically the catalyst comprises a metallocene having a cyclopentadienyl ligand and a fluorenyl ligand. In these embodiments it is preferred that the catalyst for forming the second polyolefin component has the following formula:

R"(CpR$^1$R$^2$R$^3$)(Cp'R$_n$')MQ$_2$ wherein Cp is a substituted or unsubstituted cyclopentadienyl ring; Cp' is a substituted or unsubstituted fluorenyl ring; R" is a structural bridge imparting stereorigidity to the component; R$^1$ is a substituent on the cyclopentadienyl ring which is distal to the bridge, which distal substituent comprises a hydrogen or a bulky group of the formula XR*$_3$ in which X is chosen from Group IVA, and each R* is the same or different and chosen from hydrogen or hydrocarbyl of from 1 to 20 carbon atoms; R$^2$ is a substituent on the cyclopentadienyl ring which is proximal to the bridge and positioned non-vicinal to the distal substituent and is a hydrogen or is of the formula YR#$_3$ in which Y is chosen from group IVA, and each R# is the same or different and chosen from hydrogen or hydrocarbyl of 1 to 7 carbon atoms, R$^3$ is a substituent on the cyclopentadienyl ring which is proximal to the bridge and is a hydrogen or is of the formula ZR$$_3$, in which Z is chosen from group IVA, and each R$ is the same or different and chosen from hydrogen or hydrocarbyl of 1 to 7 carbon atoms; n is an integer of from 0-8; each R'$_n$ is the same or different and is a group AR'''3 in which A is chosen from group IVA and each R''' is the same or different and chosen from hydrogen or a hydrocarbyl having 1 to 20 carbon atoms; M is a Group IVB transition metal or vanadium; and each Q is hydrocarbyl having 1 to 20 carbon atoms or is a halogen.

Preferably X, Y, Z and A are independently selected from carbon and silicon. Typically R$^1$ is selected from C(CH$_3$)$_3$, C(CH$_3$)$_2$Ph, CPh$_3$ and Si(CH$_3$)$_3$. Generally R$^2$ is CH$_3$ and R$^3$ is CH$_3$.

In a preferred embodiment n is 2 and more preferably the fluorenyl group is substituted at the 3-position and the 6-position. Typically each R' is selected from C(CH$_3$)$_3$ and Si(CH$_3$)$_3$. Most preferably, the R' groups are the same. It is also preferred that the fluorenyl ring is unsubstituted at both positions 4 and 5.

R" is typically selected from alkylidene having 1-20 carbon atoms, a dialkyl germanium or silicon or siloxane, an alkyl phosphine and an amine. More preferably, R" is isopropylidene or dimethylsilanediyl.

For both the catalysts for steps (a) and (b) M is typically zirconium or titanium and Q is typically a halogen, such as chlorine.

The present process can be applied to produce any polyolefin, but it is preferred that the process is employed for producing a polyethylene or a polypropylene.

The present invention also provides a polyolefin obtainable according to a process as defined above and a multisite catalyst system for producing a polyolefin having a multimodal molecular weight distribution, which catalyst system comprises two or more catalyst components immobilised on a support, wherein the catalyst components comprise one or more catalyst components as defined above.

The polyolefins of the present invention, and in especially the polyethylenes of the present invention, are particularly advantageous when used in pipes and films, and in blow moulding processes.

In addition to the above catalyst components, the catalyst system of the present invention may comprise one or more activating agents capable of activating any one or more of the catalyst components. Typically, the activating agent comprises an aluminium- or boron-containing activating agent.

Suitable aluminium-containing activating agents comprise an alumoxane, an alkyl aluminium compound and/or a Lewis acid.

The alumoxanes that can be used in the present invention are well known and preferably comprise oligomeric linear and/or cyclic alkyl alumoxanes represented by the formula (I):

for oligomeric linear alumoxanes; and formula (II)

for oligomeric cyclic alumoxanes, wherein n is 1-40, preferably 10-20; m is 3-40, preferably 3-20; and R is a $C_1$-$C_8$ alkyl group, preferably methyl. Generally, in the preparation of alumoxanes from, for example, aluminium trimethyl and water, a mixture of linear and cyclic compounds is obtained.

Suitable boron-containing activating agents may comprise a triphenylcarbenium boronate, such as tetrakis-pentafluorophenyl-borato-triphenylcarbenium as described in EP-A-0427696:

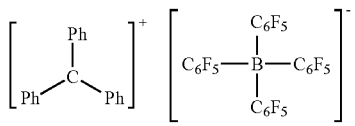

or those of the general formula below, as described in EP-A-0277004 (page 6, line 30 to page 7, line 7):

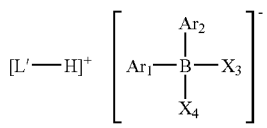

Other preferred activating agents include hydroxy isobutylaluminium and a metal aluminoxinate. These are particularly preferred when at least one Q in the general formula for metallocenes comprises an alkyl group.

The metallocene catalyst system is generally employed in a slurry process, which is heterogeneous.

In the present catalyst system, the catalyst components are immobilised on an inert support, particularly a porous solid support such as talc, inorganic oxides and resinous support materials such as polyolefin. Preferably, the support material is an inorganic oxide in its finally divided form.

Suitable inorganic oxide materials which are desirably employed in accordance with this invention include Group IIA, IIIA, IVA or IVB metal oxides such as silica, alumina and mixtures thereof. Other inorganic oxides that may be employed either alone or in combination with the silica, or alumina are magnesia, titania, zirconia, and the like. Other suitable support materials, however, can be employed, for example, finely divided functionalised polyolefins such as finely divided polyethylene. Preferably, the support is a silica having a surface area comprised between 200 and 900 $m^2$/g and a pore volume comprised between 0.5 and 4 ml/g.

The amount of alumoxane and metallocenes usefully employed in the preparation of the solid support catalyst can vary over a wide range. Preferably the aluminium to transition metal mole ratio is in the range between 1:1 and 100:1, preferably in the range between 5:1 and 50:1.

The order of addition of the metallocenes and alumoxane to the support material can vary. In accordance with a preferred embodiment of the present invention alumoxane dissolved in a suitable inert hydrocarbon solvent is added to the support material slurried in the same or other suitable hydrocarbon liquid and thereafter a mixture of the metallocene catalyst component is added to the slurry.

Preferred solvents include mineral oils and the various hydrocarbons which are liquid at reaction temperature and which do not react with the individual ingredients. Illustrative examples of the useful solvents include the alkanes such as pentane, iso-pentane, hexane, heptane, octane and nonane; cycloalkanes such as cyclopentane and cyclohexane; and aromatics such as benzene, toluene, ethylbenzene and diethylbenzene.

Preferably the support material is slurried in toluene and the metallocene and alumoxane are dissolved in toluene prior to addition to the support material.

Where the reaction is performed in a slurry using, for example, isobutane, a reaction temperature in the range 70° C. to 110° C. may be used.

In accordance with the invention, the olefin monomer, such as ethylene and the alpha-olefinic co-monomer is supplied to the reaction zone containing the metallocene catalyst. When making a LMW component, typically hydrogen is introduced into the reaction zone. When making a HMW component, typically an α-olefinic co-monomer is added to the reaction zone. Typical co-monomers include hexene, butene, octene or methylpentene, preferably hexene.

The present invention also provides a polyolefin obtainable according to a process as defined above. The polyolefin of the present invention is easy to process because of its bimodal character and it can be used in diverse applications such as for examples pipes, films and blow moulded articles.

Moreover, the invention also provides a multisite catalyst system for producing a polyolefin having a multimodal molecular weight distribution, which catalyst system comprises two or more catalyst components immobilised on a support, wherein the catalyst components comprise a first catalyst component as defined above in respect of step (a), and a second catalyst component as defined above in respect of step (b).

The present invention further provides use of a multisite catalyst system as defined above, to produce a polyolefin having a controlled multimodal molecular weight distribution.

What is claimed is:

1. A process for producing a polyolefin having a multimodal molecular weight distribution, which process comprises:
   (a) polymerizing a first olefin monomer in the presence of a bis-indenyl metallocene catalyst, to form a first multimodal polyolefin component, said bis-indenyl metallocene catalyst being represented by formula (I):

$$(Ind)_2R''MQ_p \qquad (I)$$

wherein:
   each Ind is the same or different and is a substituted or unsubstituted indenyl group, or a substituted or unsubstituted tetrahydroindenyl group; R" is a structural bridge imparting stereorigidity to the component; M is a metal atom from group IVB, VB or VIB of the periodic table; p is the valence of M minus 2; and each Q is a hydrocarbon having from 1-20 carbon atoms or is a halogen; and
   (b) polymerizing a second olefin monomer in the presence of a second metallocene catalyst to form a second polyolefin component, said second metallocene catalyst being represented by formula (II):

$$R''(CpR^1R^2R^3)(Cp'R'_n)MQ_2 \qquad (II)$$

wherein:
   Cp is a substituted or unsubstituted cyclopentadienyl ring; $C_p'$ is a substituted or unsubstituted fluorenyl group; R" is a structural bridge imparting stereorigidity to the component; $R^1$ is a substituent on the cyclopentadienyl ring which is distal to the bridge, which distal substituent comprises a hydrogen or a bulky group of the formula $XR^*_3$ in which X is chosen from Group IVA, and each R* is the same or different and chosen from hydrogen or hydrocarbyl of from 1-20 carbon atoms; $R^2$ is a substituent on the cyclopentadienyl ring which is proximal to the bridge and positioned non-vicinal to the distal substituent and is a hydrogen or is of the formula YR#$_3$ in which Y is chosen from group IVA, and each R# is the same or different and chosen from hydrogen or hydrocarbyl of 1-7 carbon atoms, R$^3$ is a substituent on the cyclopentadienyl ring which is proximal to the bridge and is a hydrogen or is of the formula ZR$$_3$, in which Z is chosen from group IVA, and each R$ is the same or different and chosen from hydrogen or hydrocarbyl of 1-7 carbon atoms; n is an integer of from 0-8; each R' is the same or different and is a group AR'''$_3$ in which A is chosen from group IVA and each R''' is the same or different and chose from hydrogen or a hydrocarbyl having 1-20 carbon atoms; wherein X, Y, Z and A are independently selected from carbon and silicon; M is a Group IVB transition metal or vanadium; and each Q is hydrocarbyl having 1-20 carbon atoms or is a halogen; and wherein the molecular weight distribution of the first polyolefin component overlaps with the molecular weight distribution of the second polyolefin component; and wherein the steps (a) and (b) are carried out in the same reaction zone.

2. The process of claim 1 wherein the first polyolefin component comprises a bimodal polyolefin.

3. The process of claim 2 wherein the second polyolefin component comprises a monomodal polyolefin.

4. The process of claim 1 wherein the indenyl groups of the catalyst are unsubstituted or are substituted at the at least one of the 2, 2', 4 and/or 4' positions.

5. The process of claim 4 wherein the indenyl groups are symmetrically substituted.

6. The process of claim 4 wherein the indenyl groups of the catalyst are substituted by a bulky group at at least one of the 4 and 4' positions.

7. The process of claim 6 wherein said bulky group is selected from the group consisting of a methyl group, an isopropyl group, a tertiary butyl group, a trimethylsilyl group, and a phenyl group.

8. The process of claim 7 wherein said bulky group is a phenyl group which forms a benzindenyl group with the indenyl group to which it is attached.

9. The process of claim 6 wherein the indenyl groups are substituted at at least one of the 2 and 2' positions by a methyl group.

10. The process of claim 4 wherein the bridging group R" in the metallocene of formula (I) is a C$_1$-C$_4$ alkylene group.

11. The process of claim 10 wherein said bridging group comprises a substituted or unsubstituted ethylene group.

12. The process of claim 1 wherein in the cyclopentadienyl-fluorenyl group, R$^1$ is selected from the group consisting of C(CH$_3$)$_3$, C(CH$_3$)$_2$Ph, CPh$_3$ and Si(CH$_3$)$_3$.

13. The process of claim 12 wherein R$^2$ is CH$_3$.

14. The process of claim 13 wherein R$^3$ is CH$_3$.

15. The process of claim 1 wherein n is 2.

16. The process of claim 15 wherein the fluorenyl group is substituted at the 3 position and the 6 position.

17. The process of claim 16 wherein each R' is selected from the group consisting of C(CH$_3$)$_3$ and Si(CH$_3$)$_3$.

18. The process of claim 17 wherein the R' groups are the same.

19. The process of claim 12 wherein R" in formula (II) is selected from alkylidene having 1-20 carbon atoms, a dialkyl germanium, silicon or siloxane, an alkyl phosphine and an amine.

20. The process of claim 19 wherein R" in formula (II) is isopropylidene or dimethylsilanediyl.

21. The process of claim 16 wherein the fluorenyl ring is unsubstituted at both positions 4 and 5.

22. The process of claim 1 wherein M is zirconium or titanium.

23. The process of claim 22 wherein Q is a halogen.

24. A process for producing a polyolefin having a multimodal molecular weight distribution, which process comprises:

(a) polymerizing a first olefin monomer in the presence of a bis-indenyl metallocene catalyst, to form a first multimodal polyolefin component, said bis-indenyl metallocene catalyst being represented by formula (I):

(Ind)$_2$R"MQ$_p$      (I)

wherein:
each Ind is the same or different and is a substituted or unsubstituted indenyl group, or a substituted or unsubstituted tetrahydroindenyl group; R" is a structural bridge imparting stereorigidity to the component; M is a metal atom from group IVB, VB or VIB of the periodic table; p is the valence of M minus 2; and each Q is a hydrocarbon having from 1-20 carbon atoms or is a halogen; and (b) polymerizing a second olefin monomer in the presence of a second metallocene catalyst to form a second polyolefin component, said second metallocene catalyst being represented by formula II:

R"(CpR$^1$R$^2$R$^3$)(Cp'R'$_n$)MQ$_2$      (II)

wherein:
Cp is a substituted or unsubstituted cyclopentadienyl ring; Cp' is a substituted or unsubstituted fluorenyl group; R" is a structural bridge imparting stereorigidity to the component; R$^1$ is a substituent on the cyclopentadienyl ring which is distal to the bridge, which distal substituent comprises a hydrogen or a bulky group of the formula XR*$_3$ in which X is chosen from Group IVA, and each R* is the same or different and chosen from hydrogen or hydrocarbyl of from 1-20 carbon atoms; R$^2$ is a substituent on the cyclopentadienyl ring which is proximal to the bridge and positioned non-vicinal to the distal substituent and is a hydrogen or is of the formula YR#$_3$ in which Y is chosen from group IVA, and each R# is the same or different and chosen from hydrogen or hydrocarbyl of 1-7 carbon atoms, R$^3$ is a substituent on the cyclopentadienyl ring which is proximal to the bridge and is a hydrogen or is of the formula ZR$$_3$, in which Z is chosen from group IVA, and each R$ is the same or different and chosen from hydrogen or hydrocarbyl of 1-7 carbon atoms; n is an integer of from 0-8; each R' is the same or different and is a group AR'''$_3$ in which A is chosen from group IVA and each R''' is the same or different and chose from hydrogen or a hydrocarbyl having 1-20 carbon atoms; wherein X, Y, Z and A are independently selected from carbon and silicon; M is a Group IVB transition metal or vanadium: and each Q is hydrocarbyl having 1-20 carbon atoms or is a halogen; and wherein the molecular weight distribution of the first polyolefin component overlaps with the molecular weight distribution of the second polyolefin component; and wherein the polymerization of paragraphs (a) and (b) are carried out in at least two series-connected reaction zones.

* * * * *

UNITED STATES PATENT AND TRADEMARK OFFICE
CERTIFICATE OF CORRECTION

PATENT NO. : 7,449,527 B2  
APPLICATION NO. : 10/529247  
DATED : November 11, 2008  
INVENTOR(S) : Abbas Razavi Page 1 of 1

It is certified that error appears in the above-identified patent and that said Letters Patent is hereby corrected as shown below:

Column 4, line 35, "pan em", should read --pattern--.

Signed and Sealed this

Ninth Day of June, 2009

JOHN DOLL  
*Acting Director of the United States Patent and Trademark Office*